Figure 1:
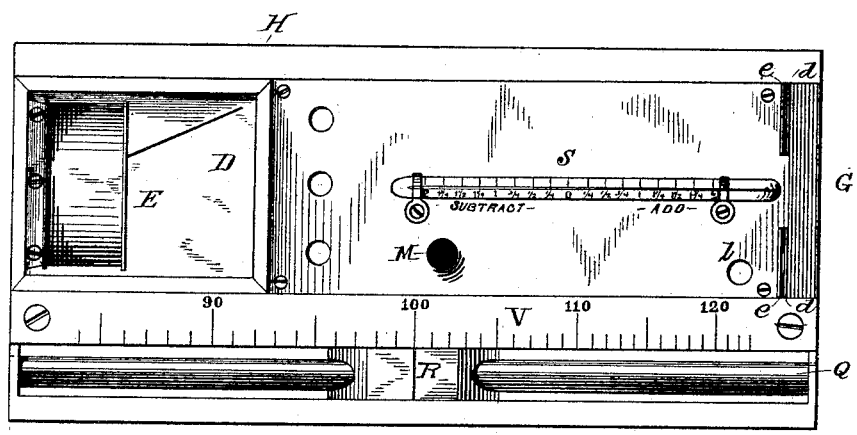

(No Model.)  2 Sheets—Sheet 1.

J. W. HOWELL.
ELECTRICAL INDICATOR.

No. 435,896.  Patented Sept. 2, 1890.

WITNESSES:  INVENTOR
John W. Howell
BY
ATTORNEYS.

(No Model.)  
2 Sheets—Sheet 2.

J. W. HOWELL.
ELECTRICAL INDICATOR.

No. 435,896. Patented Sept. 2, 1890.

WITNESSES:

INVENTOR
John W. Howell
BY
ATTORNEYS.

UNITED STATES PATENT OFFICE.

JOHN W. HOWELL, OF NEWARK, ASSIGNOR TO THE EDISON LAMP COMPANY, OF HARRISON, NEW JERSEY.

ELECTRICAL INDICATOR.

SPECIFICATION forming part of Letters Patent No. 435,896, dated September 2, 1890.

Application filed March 30, 1889. Serial No. 305,486. (No model.)

*To all whom it may concern:*

Be it known that I, JOHN W. HOWELL, a citizen of the United States, residing at Newark, in the county of Essex and State of New Jersey, have invented a certain new and useful Improvement in Electrical Indicators, of which the following is a specification.

My invention relates to that class of electrical indicators known as "potentiometers," which are employed to measure or indicate in volts the difference of potential in an electrical circuit, and more especially to those instruments in which a standard battery-cell is placed in a shunt around a variable portion of a known resistance connected across the circuit in question, a galvanometer and key being included in the battery-shunt, so that when in such shunt the opposing electro-motive forces of the battery and the main circuit are equal the galvanometer stands at zero, and when they are unequal the galvanometer is deflected. Then by varying the portion of the known resistance around which the shunt is taken the galvanometer is brought back to zero, and by the proportion of the known resistance around which the shunt is connected the difference in potential on the main circuit is determined.

The present invention relates to certain improvements in indicators, my object being to increase the accuracy and effectiveness of such instruments and their range of use.

One feature of my invention is the use of two cells of battery provided with means for including either or both of them in the shunt, whereby the potential of the shunt may be doubled, when required, which enables the instrument to be used for indicating two different ranges of pressures, one of which is double the other.

Another feature is the providing of a shunt-circuit around a known part of the resistance, which shunt has a circuit breaker and closer, so that this part of the resistance may be used or not, as desired. This further increases the range of potentials with which the instrument can be used.

Another feature is the employment of a thermometer whose bulb is situated in that part of the instrument which is affected by changes in temperature and whose scale is graduated in volts, so as to indicate the number of volts which must be added to or subtracted from the result shown by the instrument to allow for changes in temperature.

In addition to these features my invention consists in various novel devices and combinations of devices employed for the purpose of producing an inexpensive, compact, readily-portable, and accurate instrument, as hereinafter set forth and claimed.

My invention is illustrated in the accompanying drawings.

Figure 2:
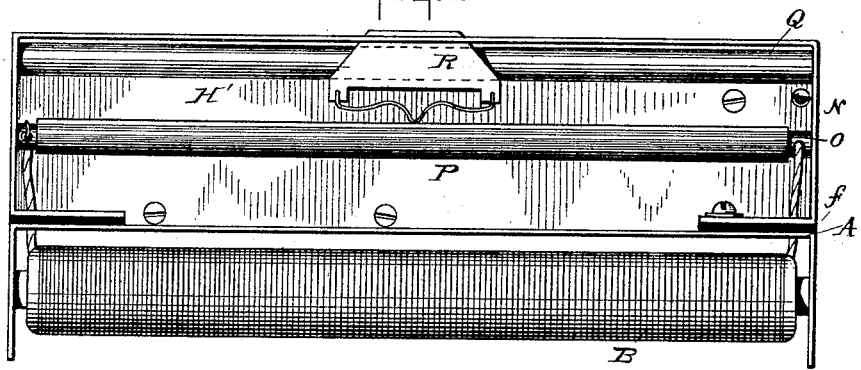
Figure 3:
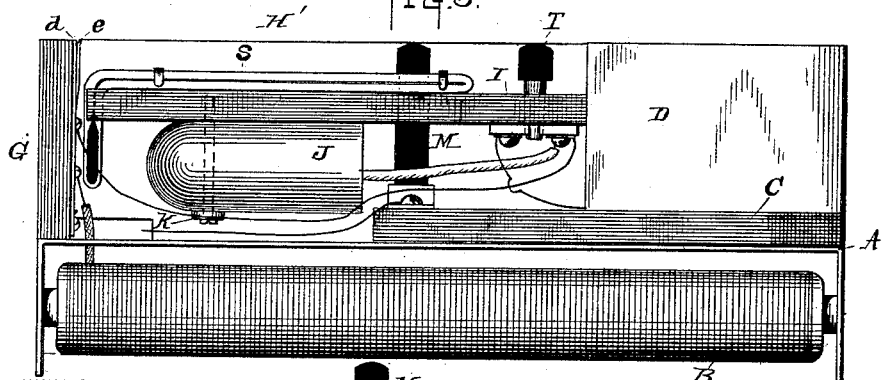
Figure 4:
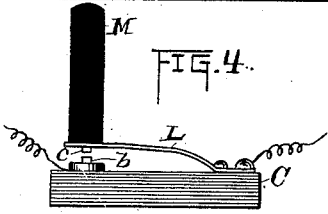
Figure 5:
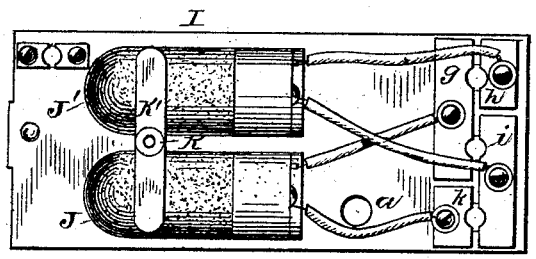
Figure 6:
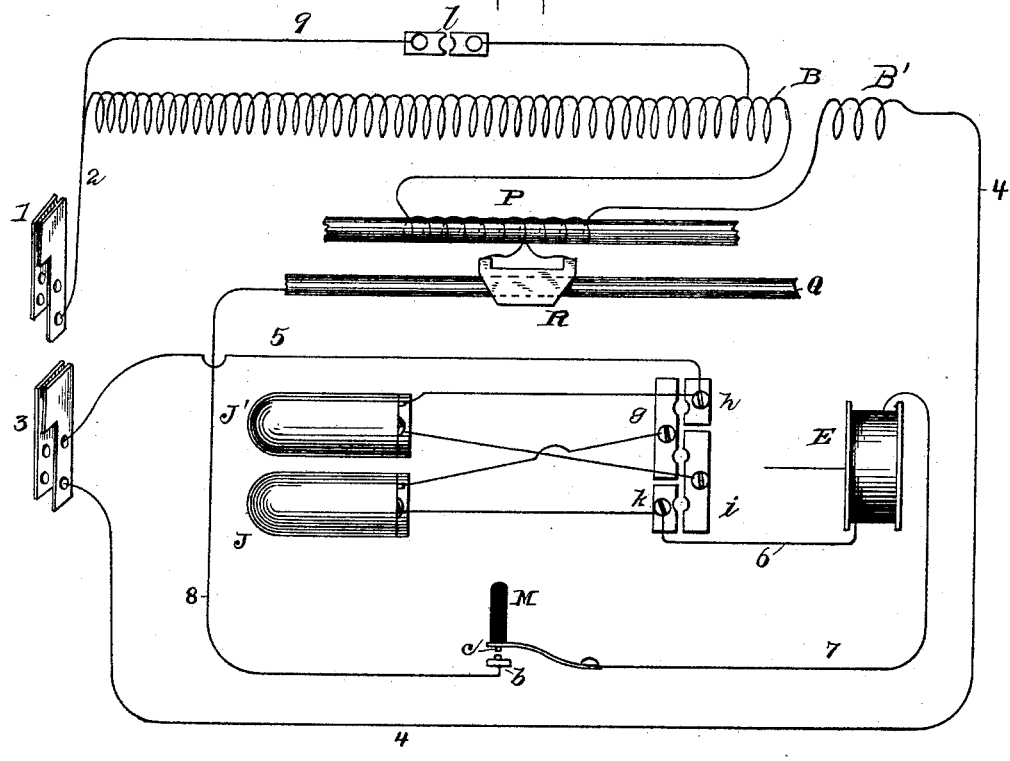

Figure 1 is a top view of the instrument; Fig. 2, a side elevation thereof; Fig. 3, an elevation of the other side with the side plate removed; Fig. 4, a view of the key; Fig. 5, a bottom plan view of the battery-cells and their connection, and Fig. 6 a diagram of the circuits and connections of the whole instrument with a perspective view of the binding-posts.

The whole instrument is placed in a suitable box, so that it can be carried from place to place, the box not being illustrated in the drawings.

A is a metal plate having downwardly-extending ribs at its ends, between which ribs is supported the resistance-coils B and B' of insulated wire wound on a flat spool. Upon the top of the plate A is set at one end a plate C, of insulating material, upon which is set a box D, having a glass top, which incloses the galvanometer E. At the other end of the plate A an end plate G, of insulating material, rises from it, and attached to this plate are side plates H and H', extending the whole length of the instrument and forming a box which incloses the battery and key. This box is closed at the top by a covering-plate I. On the lower side of the plate I are attached two battery-cells J and J', and these are held against the plate by a stem K, extending from the plate between the two cells and having a cross-head K' extending across the two cells. The cells may be any suitable compact form of constant battery-cells.

Upon the insulating-plate C is supported a circuit-closing key consisting of a contact-point $b$ on the insulating-plate and an opposing-point $c$, carried by a flat spring L, attached to the plate. From the spring L an insulating-stem M extends up through a hole $a$ in the covering-plate I. Between said covering-plate and the end plate G are two metal plates $d$, each of which has a spring-plate $e$ attached to it, and these form the binding-posts, the connection with the circuit being made by inserting flat terminal strips between the plates $d$ and $e$. The metal plate A extends outside of the side plate H', as shown in Fig. 2, and supported upon said plate and insulated from it at the ends by interposed rubber cushions $f$ is a frame of metal N. Supported within this frame is a rod O, on which is wound a coil of insulated wire P, the insulation being removed from said wire on its upper side. Immediately above the rod O is another metal rod Q, upon which slides a metal contact-piece R, having a spring which slides along the bared portion of the resistance-coil P. The coil P forms the variable portion of the total resistance.

S is a thermometer, whose bulb is placed within the space covered by the plate I and whose tube extends up through said plate and rests upon it, being held by suitable clips. The scale of this thermometer is graduated from the central point in both directions in fractions of volts. Upon the under side of the plate I are attached four metal plates $g$ $h$ $i$ $k$. The battery-cell J' is connected by wires with plates $h$ $i$. The cell J is connected with the plates $g$ $k$. Holes are formed between the plates, as shown, and corresponding holes extend through the covering-plate I, so that by the insertion of plugs, as T, the connections of the batteries may be made and broken.

The connections of the whole instrument are as follows: From the binding-post 1 a wire 2 extends to one end of the resistance-coil B. The coil P is connected in series between the coils B and B'. From the other binding-post 3 a wire 4 extends to the other end of the resistance-coil B' and another wire 5 extends to the plate $h$. From the plate $k$ wire 6 extends to the galvanometer, and from the galvanometer by wire 7 connection is made with the contact-point $c$ of the key. From the other contact-point $b$ of the key wire 8 extends to the rod Q, on which the contact-piece R slides. A shunt-circuit 9 is formed around a definite part of the resistance B, it being, as shown, around three-fourths of the total resistance, including resistance P, and such shunt is arranged to be closed by the insertion of a plug at $l$. It will thus be seen that when the instrument is connected at the binding-posts 1 and 3 across the circuit to be indicated the path of the current in such circuit through the instrument will be as follows: A portion of the current will pass from binding-post 3 by wire 4, through resistance-coils B and P and wire 2 to binding-post 1, and another portion will pass through wire 5 to the battery or batteries and by wire 6, gal-vanometer E, wire 7, key M, wire 8, rod Q, to contact-piece R, where it joins the other circuit. The contact-piece R may now be adjusted until the potential due to the part of the known resistance around which the shunt is connected becomes equal to the potential of the battery. Then no current will flow in the shunt-circuit and the galvanometer will show no deflection when the key is closed. The pressure is then known by the position of the contact-piece R, which determines the proportion of the known resistance which is spanned by the shunt-circuit. A scale V, graduated in volts, is provided, and the contact-piece R moves along such scale, so that the potential of the circuit can be immediately read off the scale. The thermometer being graduated in volts in order to make allowance for the temperature of the instrument, it is only necessary to add or subtract the indication of the thermometer from the reading of the scale V. It will be seen that if the plates $i$ $k$ are joined together by the insertion of a plug between them only the cell J' will be in circuit, and if only the plates $g$ $h$ are joined together the cell J will be alone in circuit; but if only the plates $g$ $i$ are joined together the two cells will be in circuit in series with each other, the circuit being by wire 5, plate $h$, cell J', plate $i$, plate $g$, cell J, plate $k$, and wire 6. Thus the electro-motive force of the battery is doubled, and this enables the instrument to be used in connection with circuits of double the potential that can be indicated when only a single cell is in circuit, whereby the range of use of the instrument is very largely increased. The shunt-circuit 9 cuts out three-fourths of the total resistance, but does not change the part around which the battery-circuit is connected. This makes the total resistance of the instrument one-fourth what it was before. The pressure of the line which acts on the instrument is known by the proportion of the total resistance around which the battery-circuit is connected, and since the total resistance is decreased to one-fourth by inserting the plug $l$ the proportion spanned by the battery-circuit is four times as great when plug $l$ is in. This enables me to read pressures one-fourth as great as can be read when plug $l$ is out and materially increases the usefulness of the instrument.

What I claim is—

1. In an electrical indicator in which the potential tested is opposed by a battery of standard potential, the combination, with means for connecting the indicator to the circuit to be tested, of the galvanometer and key, two battery-cells, forming a part of said indicator, and connections whereby one or both of said cells may be placed in the circuit, substantially as set forth.

2. In an electrical indicator, the combination of an inclosing-case, a standard battery-cell in said case, and a thermometer having its bulb in the case and its stem extending outside the case and graduated in the same denomination as the indicator-scale, substantially as set forth.

3. In a potentiometer, the combination, with the standard battery-cell, of a thermometer having its bulb in proximity to said cell and its scale graduated in volts, substantially as set forth.

4. In a potentiometer, the combination of a known resistance and a galvanometer-key and standard battery in a shunt around a variable portion of said resistance, and means for removing a definite part of said resistance from circuit, substantially as set forth.

5. In a potentiometer, the combination, with a known resistance and a galvanometer-key and standard battery in a shunt around a variable portion of said resistance, of a shunt around a definite part of said resistance and a circuit-closer in said shunt substantially as as set forth.

This specification signed and witnessed this 25th day of March, 1889.

JOHN W. HOWELL.

Witnesses:
J. DAY FLACK,
J. T. MARSHALL.